United States Patent

McCallum, III et al.

[11] Patent Number: 5,866,664
[45] Date of Patent: Feb. 2, 1999

[54] PROCESS FOR PREPARING PHOSPHONATE-TERMINATED POLYMERS

[75] Inventors: Thomas Francis McCallum, III, Havertown; Barry Weinstein, Dresher, both of Pa.

[73] Assignee: Rohm and Haas Company, Philadelphia, Pa.

[21] Appl. No.: 794,030

[22] Filed: Feb. 3, 1997

[51] Int. Cl.⁶ ....................................................... C08F 2/00
[52] U.S. Cl. ...................... 526/233; 526/317.1; 526/281
[58] Field of Search .............................................. 526/233

[56] References Cited

U.S. PATENT DOCUMENTS

| | | |
|---|---|---|
| 4,046,707 | 9/1977 | Smith et al. . |
| 4,621,127 | 11/1986 | Denzinger et al. ...................... 526/233 |
| 4,774,303 | 9/1988 | Denzinger et al. ...................... 526/233 |
| 5,077,361 | 12/1991 | Hughes et al. ........................... 526/233 |
| 5,142,008 | 8/1992 | Holle et al. .............................. 526/233 |
| 5,185,413 | 2/1993 | Yoshinaga et al. ...................... 526/233 |
| 5,256,746 | 10/1993 | Blankenship et al. ................... 526/233 |
| 5,294,686 | 3/1994 | Fiarman et al. ......................... 526/233 |
| 5,294,687 | 3/1994 | Blankenship et al. ................... 526/233 |
| 5,376,731 | 12/1994 | Kerr et al. . |
| 5,386,038 | 1/1995 | Davis et al. . |

FOREIGN PATENT DOCUMENTS

| | | | |
|---|---|---|---|
| 0 360 746 A2 | 9/1988 | European Pat. Off. . | |
| 0510831 | 10/1992 | European Pat. Off. ................ | 526/233 |
| 1403732 | 5/1965 | France .................................... | 526/233 |
| 996737 | 2/1963 | United Kingdom . | |

OTHER PUBLICATIONS

Chemical Abstracts, vol. 78, No. 24, p. 4, Jun. 18, 1973, V.P. Zubov et al., *Polymerization of Allyl Monomers in the Presence of Phosphoric Acid*.

EO Search Report dated Jun. 18, 1997.

*Primary Examiner*—Joseph L. Schofer
*Assistant Examiner*—N. Sarofin
*Attorney, Agent, or Firm*—Thomas J. Howell

[57] ABSTRACT

A process for efficiently utilizing phosphorous acid or salts thereof as a chain transfer agent in the polymerization of monomers, particulary unsaturated carboxylic acid monomers, is provided, where the polymerization is conducted at an in-process solids level of at least 40 percent and in-process neutralization level of at least 30% to produce low molecular weight water-soluble phosphonate-terminated polymers.

17 Claims, No Drawings

PROCESS FOR PREPARING PHOSPHONATE-TERMINATED POLYMERS

BACKGROUND

This invention relates to a process for preparing low molecular weight phosphonate-terminated polymers. In particular, this invention relates to a process for the efficient use of phosphorous acid as a chain transfer agent in aqueous polymerizations.

Low molecular weight polycarboxylic acid polymers and their salts are useful as dispersants, scale inhibitors, detergent additives, sequestrants, etc. Generally a molecular weight below 50,000 is necessary for effective performance and often very low molecular weights below 10,000 are most effective. It is common to use chain transfer agents in the polymerization reaction to produce low, and especially the very low, molecular weight polymers. Phosphorous and hypophosphorous acid and their corresponding salts (commonly sodium phosphite and hypophosphite, respectively) are particularly desirable chain transfer agents, chosen primarily because they introduce phosphonate and phosphinate functionality, respectively, into water-soluble polymer molecules which confers superior performance properties in some applications. As used hereinafter and in the appended claims, the term "phosphorous acid" is intended to include phosphorous acid and its derivatives, for example, salts thereof, such as alkali and alkaline earth metal salts (metal phosphites), unless a clearly different meaning is indicated.

Inefficiency is a problem that is common to most of the known processes utilizing phosphorous acid as a chain transfer agent. A significant portion is not incorporated into the polymer and remains unreacted or is converted to other species such as phosphoric acid or corresponding salts. As a consequence, high levels of phosphorous acid are required to obtain low molecular weight polymer. Since phosphorous acid is relatively costly its use may be prohibitively expensive if the phosphorous acid is not used efficiently.

A second disadvantage arising from the inefficiency is the significant amounts of unreacted phosphite or oxidized byproduct, such as phosphate, salt residues present in the reaction product. These salts do not contribute to performance thereby diluting the activity of the reaction product. In some cases, such as preparing concentrated clay slurries, these salts can interfere with the dispersing process.

Low molecular weight polycarboxylic acid polymers are conventionally produced by reacting certain olefinic monomers with phosphorous acid or phosphorous acid derivatives in the presence of a free-radical initiator. Yields of the desired phosphonate-terminated polymer are low, and the polymer contains high levels of residual phosphorous acid and phosphate impurities. When derivatives of phosphorous acid, for example esters, are used as chain transfer agents, separate hydrolysis and stripping steps are required to recover the polymer. For example, EP 360746A discloses a method of preparing copolymers containing phosphonate endgroups involving the reaction of olefinic reactants with phosphorous acid or derivatives thereof (such as dialkyl phosphites or alkali metal salts) in the presence of a free-radical initiator. The use of dialkyl phosphites as starting materials in this method requires the use of non-aqueous systems and subsequent hydrolysis and purification.

Another method of preparing copolymers containing phosphonate endgroups using hypophosphorous acid is disclosed in U.S. Pat. No. 5,376,731. The method disclosed involves the reaction of an olefinic reactant with a monoalkyl phosphinate to form a dialkyl phosphinate intermediate, followed by oxidation of the latter to a phosphonate-terminated polymer. Hypophosphorous acid is initially reacted with a carbonyl compound to form the monoalkyl phosphinate. This process involves several separate steps, that may require isolation of intermediates, etc., and has the further disadvantage of producing a mixture of phosphinate and phosphonate-terminated polymer product, unreacted hypophosphite and chloride byproducts.

U.S. Pat. No. 5,386,038 discloses the preparation of phosphonate-terminated oligomers of maleic acid and acrylic acid using sodium phosphite in the presence of a high levels of free-radical initiator. U.S. Pat. No. 4,046,707 discloses the preparation of copolymers containing phosphonate and phosphinate endgroups involving the reaction of olefinic reactants with phosphorous acid or hypophosphorous acid and derivatives thereof (such as dialkyl phosphites, alkyl hypophosphites, phosphinic acids and alkali metal salts) in the presence of a free-radical initiator; the use of phosphorous acid to prepare low molecular weight poly(acrylic acid) is disclosed. GB 996,737 discloses the use of phosphorous acid or its salts to produce high molecular weight polymers that are useful in producing fibers, where the pH of the reaction mixture is adjusted to 4–5 before the polymerization. U.S. Pat. No. 4,621,127 discloses the preparation of carboxyl-containing polymers where inorganic phosphorus compounds, including hypophosphite and phosphite, are used to improve the color of the resulting polymer solutions.

The present invention seeks to overcome the problems associated with prior art processes used to prepare phosphonate-terminated polymers.

STATEMENT OF INVENTION

According to a first aspect of the present invention there is provided a process for preparing low-molecular weight phosphonate-terminated polymers, comprising polymerizing monomers selected from one or more of unsaturated carboxylic acid monomers, unsaturated "non-carboxylic" acid monomers and unsaturated acid-free monomers, in the presence of (a) water, (b) one or more water-soluble initiators and (c) phosphorous acid or a salt thereof; wherein the unsaturated carboxylic acid monomers comprise unsaturated monocarboxylic acid monomers and unsaturated dicarboxylic acid monomers; wherein from 75 to 100 percent by weight of the unsaturated monocarboxylic acid monomers are metered into a polymerization reactor containing water and from 25 to 100 percent by weight of the phosphorous acid or salts thereof; and wherein an alkaline neutralizer is present during the polymerization in an amount sufficient to neutralize at least 30 percent, based on equivalents, of the acid groups of the unsaturated carboxylic acid monomers present; to provide an in-process solids level of at least 40 percent based on the weight of solid reactants relative to the combined weight of solid reactants and water at the end of the polymerization.

In another aspect the present invention provides a process as described above wherein the in-process solids level is from 50 to 70 percent by weight and the alkaline neutralizer is present in an amount sufficient to neutralize 50 to 100 percent, based on equivalents, of the acid groups of the unsaturated carboxylic acid monomers.

DETAILED DESCRIPTION

The process of the present invention uses phosphorous acid as a chain transfer agent for the polymerization of one or more monomers, for example in the preparation of low molecular weight homopolymers, copolymers and terpolymers. Preferably, at least 20 percent (%) by weight of the one or more monomers are unsaturated acid monomers or water-soluble salts thereof. Water-soluble salts of the unsaturated acid monomers are, for example, the alkali metal salts (such as sodium or potassium) and the ammonium or substituted ammonium salts thereof. Unsaturated acid monomers can be monoacids such as unsaturated monocarboxylic acid monomers, diacids such as unsaturated dicarboxylic acid monomers, or polyacids.

"Unsaturated carboxylic acid monomer," as used herein, refers to unsaturated monocarboxylic acid monomers, unsaturated dicarboxylic acid monomers and any unsaturated monomer containing more than two carboxylic acid groups, e.g., polyacid, and water-soluble salts thereof.

"Unsaturated monocarboxylic acid monomer," as used herein, refers to unsaturated carboxylic acid monomers containing a single carboxylic acid group and water-soluble salts thereof. Suitable unsaturated monocarboxylic acid monomers are, for example, acrylic acid, oligomeric acrylic acid, methacrylic acid, crotonic acid and vinylacetic acid.

"Unsaturated dicarboxylic acid monomer," as used herein, refers to unsaturated dicarboxylic acid monomers containing 4 to 10, preferably from 4 to 6, carbon atoms per molecule and anhydrides of the cis-dicarboxylic acids, and water-soluble salts thereof. Suitable unsaturated dicarboxylic acid monomers useful in the process of the present invention include, for example, maleic acid, maleic anhydride, fumaric acid, α-methylene glutaric acid, itaconic acid, citraconic acid, mesaconic acid, cyclohexenedicarboxylic acid, cis-1,2,3,6-tetrahydrophthalic anhydride (also known as cis-4-cylcohexene-1,2-dicarboxylic anhydride), 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride and 2-methyl-1,3,6-tetrahydrophthalic anhydride. Preferred unsaturated dicarboxylic acid monomers are maleic acid and maleic anhydride.

Suitable unsaturated "non-carboxylic" acid monomers include, for example, allylsulfonic acid, allylphosphonic acid, allyloxybenzenesulfonic acid, 2-acrylamido-2-methylpropanesulfonic acid (the acryonym "AMPS" for this monomer is a trademark of Lubrizol Corporation, Wickliffe, Ohio, U.S.A.), 2-hydroxy-3-(2-propenyloxy)propanesulfonic acid, 2-methyl-2-propene-1-sulfonic acid, isopropenylphosphonic acid, vinylphosphonic acid, phosphoethyl methacrylate, styrenesulfonic acid, vinylsulfonic acid and the alkali metal and ammonium salts thereof. A preferred unsaturated "non-carboxylic" acid monomer is 2-acrylamido-2-methyl-propanesulfonic acid.

In addition, the process of the present invention can be used to copolymerize one or more unsaturated acid-free monomers. Suitable unsaturated acid-free monomers include ($C_1$–$C_4$)alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate. Other unsaturated acid-free monomers are acrylamides and alkyl-substituted acrylamides including acrylamide, methacrylamide, N-tert-butylacrylamide, N-methylacrylamide, and N,N-dimethylacrylamide. Additional examples of unsaturated acid-free monomers include acrylonitrile, methacrylonitrile, allyl alcohol, 2-vinylpyridine, 4-vinylpyridine, N-vinylpyrrolidone, N-vinylformamide, N-vinylimidazole, vinyl acetate, hydrolyzed vinyl acetate and styrene.

Preferably, the monomers are selected from one or more of acrylic acid, methacrylic acid, maleic acid, maleic anhydride, 2-acrylamido-2-methylpropanesulfonic acid and water-soluble salts thereof.

The process of the present invention is particularly useful for preparing water-soluble polymers based on monomers comprising from 20 to 100 percent by weight of monomers selected from one or more of unsaturated mono- and dicarboxylic acid monomers and from 80 to 0 percent by weight of monomers selected from one or more unsaturated acid-free monomers. Other polymers of interest include those based on monomers comprising from 25 to 90 percent by weight of monomers selected from one or more of unsaturated mono- and dicarboxylic acid monomers and from 75 to 10 percent by weight of monomers selected from one or more unsaturated "non-carboxylic" acid monomers.

If desired, it is possible to incorporate polyethylenically unsaturated compounds into the polymerization process. Polyethylenically unsaturated compounds function as crosslinking agents and will result in the formation of higher molecular weight polymers.

The chain transfer agent or chain regulator used in the process of the present invention is phosphorous acid or a salt thereof such as sodium phosphite or ammonium phosphite. Phosphorous acid may be used at a level of from 1 to 25%, preferably from 2 to 20%, more preferably from 5 to 20% and most preferably from greater than 5% to about 15%, by weight based on total monomer weight.

The purpose of using phosphorous acid in the polymerization of unsaturated acid monomers is two fold. One objective is to provide polymers containing substantially all phosphonate endgroups, that is, no phosphinate groups. The desirable end use properties of such polymers versus phosphino or mixed phosphono/phosphino polymers as dispersants and scale inhibitors in water treatment applications is discussed elsewhere. The second objective is to use the chain transfer activity of the phosphono group to provide low molecular weight polymers in a controlled manner, that is, to provide very low molecular weight polymers, such as those having a weight average molecular weight below 10,000, preferably below 5,000.

Prior art methods used to produce polymers with phosphono/phosphino endgroups have depended primarily on the use of hypophosphorous acid and its derivatives as chain transfer agents. The efficiency of hypophosphorous acid as a chain transfer agent is significantly greater than that of phosphorous acid and accounts for the wide use of hypophosphorous acid and hypophoshites as chain transfer agents. However, the the use of hypophosphorous acid introduces primarily phosphino groups or mixtures of phosphino and phosphono groups into the resultant polymers; polymers containing substantially all phosphono groups are not readily available by this route.

Methods used to improve the efficiency of hypophosphorous acid as a chain transfer agent to provide phosphinate-containing polymers are disclosed in U.S. Pat. No. 5,077,361 and U.S. Pat. No. 5,294,686. These references teach 50–90% and 64–98%, respectively, for hypophosphorous acid chain transfer efficiency.

In contrast to the 50–98% chain transfer efficiency for phosphorus incororation using hypophosphorous acid that is taught in the above references, U.S. Pat. No. 4,046,707 discloses a process using phosphorous acid, ostensibly to provide phosphonate-terminated poly(acrylic acid), where the efficiency of phosphorus incorporation is only about 20–25% (Examples H and I, columns 6–7). Thus, although the preparation of phosphonate-terminated polymers has been disclosed by various synthetic routes, there is a need to overcome the inefficient utilization of phosphorous acid in the preparation of these polymers, since even the use of hypophosphorous acid, a much more efficient chain transfer agent, does not produce the desired phosphonate-terminated polymers.

When using phosphorous acid as the chain transfer agent, the in-process solids level has a significant effect on the chain transfer efficiency. "In-process solids" level is the amount, by weight, of solid reactants or reactants ultimately converted to solid materials (such as polymer), relative to the total weight of the reaction mixture (combined weight of solid reactants and water) in the reactor at the end of the polymerization, that is, at the end of any monomer or initiator feeds, but before any dilution water is added for post-polymerization processing. Preferably, the polymerization is run at in-process solids levels of from 40 to 70%, more preferably from 50 to 70%, and most preferably from 55 to 65% by weight. At in-process solids levels above about 70% by weight the viscosity of the polymer solution increases to the point where mixing becomes difficult. If the polymer solution is not mixed well, gel formation or other impurities may be observed. By conducting the polymerization at an in-process solids level of at least about 50% by weight, the relative amount of sodium phosphite (phosphorous acid chain transfer agent) that enters into the chain transfer process and becomes incorporated into the polymer molecules (as phosphonate endgroups) is increased.

An example of the effect of in-process solids level on polymer molecular weight is summarized in Table 1 (polymerization conditions as described in Example 4 except for the variation of in-process solids level: 1% persulfate initiator, 6 ppm Fe promoter, 10% phosphorous acid (based on monomer) and 95% in-process neutralization). The degree to which increased in-process solids levels effectively decrease the molecular weight is a direct indication of increased phosphorus incorporation into the polymer.

TABLE 1

| Example # | $M_w$ | In-Process Solids (%) |
|---|---|---|
| 4 | 16100 | 40 |
| 5 | 9410 | 50 |
| 4A | 5540 | 56 |
| 4B | 4040 | 60 |

When using phosphorous acid as the chain transfer agent, it is preferred that any unsaturated carboxylic acid monomers included in the monomer mixture be used in their partially neutralized form. If salts of the unsaturated carboxylic acid monomers are used, they may be neutralized prior to the polymerization or during the polymerization. When the unsaturated carboxylic acid monomers are neutralized during the polymerization, the neutralizing solution may be fed separately, cofed, or fed with one or more of the other feeds. The alkaline neutralizer may be any inorganic or organic base. Among the preferred bases for partially neutralizing the one or more unsaturated carboxylic acid monomers are, for example, sodium hydroxide, potassium hydroxide, ammonium hydroxide, triethanolamine, dimethylaminoethanol, ethanolamine and trimethylhydroxyethylammonium hydroxide.

We have found that the degree of in-process neutralization has a signicificant effect on the chain transfer efficiency and level of incorporation of phosphorus into the polymer chain when using phosphorous acid as the chain transfer agent. The improved efficiency is obtained by the in-process neutralization of any carboxylic acid containing monomers. "In-process neutralization," as used herein, refers to the relative degree of neutralization, on an equivalents basis, of any carboxylic acid groups (from the use of unsaturated carboxylic acid monomers) that occurs during the polymerization. When used, in-process neutralization preferably comprises cofeeding 30 to 100%, preferably greater than 40%, more preferably greater than 50%, most preferably greater than 75%, equivalents of alkaline neutralizer (based on the carboxylic acid or anhydride monomer content of the reaction mix) along with any unsaturated carboxylic acid monomers, optionally with some unsaturated "non-carboxylic" acid monomer or unsaturated acid-free monomer, phosphorous acid chain transfer agent, water-soluble initiator and water to the reactor.

An example of the effect of the degree of in-process neutralization on polymer molecular weight and the utilization of chain transfer agent is summarized in Table 2 (polymerization conditions as described in Example 1 except for the variation of the degree of in-process neutralization: 92° C., 1% persulfate initiator, 6 ppm Fe promoter, 10% phosphorous acid (based on monomer) and 56% in-process solids). Phosphorus incorporation into the polymer was determined by $^{31}$P NMR analysis and is inversely proportional to $M_w$.

TABLE 2

| Example # | $M_w$ | Mole % P Incorporated | In-Process Neutralization (%) |
|---|---|---|---|
| 1A | 11000 | 14 | 30 |
| 1 | 11300 | 15 | 50 |
| 2 | 7440 | 23 | 75 |
| 4A | 5540 | 32 | 95 |
| 3 | 4890 | 35 | 100 |

The processes by which the polymers of the present invention may be prepared are aqueous processes, substantially free of organic solvents. The water may be introduced into the polymerization reactor initially, as a separate feed, as the solvent for one or more of the other components of the reaction mixture or some combination thereof. The total amount of water is selected to provide a final polymer solids level preferably in the range from about 50 to about 70% by weight.

Suitable initiators for the processes of the present invention are any conventional water-soluble initiators. One class of suitable initiators are thermal initiators such as hydrogen peroxide, certain alkyl hydroperoxides, dialkyl peroxides, persulfates, peresters, percarbonates, ketone peroxides and azo initiators. Specific examples of suitable free-radical initiators include hydrogen peroxide, tert-butyl hydroperoxide, di-tert-butyl peroxide, sodium persulfate, ammonium persulfate, potassium persulfate, tert-amyl hydroperoxide and methylethyl ketone peroxide. The water-soluble free-radical initiators are preferably used in amounts from 0.5 to 20%, more preferably from 1 to 15% and most preferably from 2 to 10%, by weight based on total monomer weight.

Water-soluble redox couples (peroxide plus reducing agent) may also be used. Suitable reducing agents include, for example, sodium bisulfite, sodium sulfite, isoascorbic acid, sodium formaldehyde-sulfoxylate and hydroxylamines, used in conjunction with suitable oxidizing agents, such as the thermal free-radical initiators noted above. The reducing agents are typically used in amounts from 0.05 to 10%, preferably from 0.5 to 5%, based on the weight of total monomer. A preferred redox couple is persulfate and bisulfite.

One or more water-soluble metal salts may be used to promote polymerization and to control the molecular weight during the polymerization. Water-soluble metal salts such as the salts of copper, iron, cobalt and manganese, may be used at levels of from 1 to 200 parts per million (ppm) by weight of the metal ion, based on the total monomer weight, and more typically from 1 to 10 ppm. Preferably, no metal promoter is used. When used, the preferred metal salts are copper salts and iron salts, which include all inorganic and organic compounds that will generate copper or iron ions in aqueous solution. Suitable salts include, for example, sulfates, nitrates, chlorides, and acetates and gluconates.

The process of the present invention can be conducted as a cofeed or heel process, and is preferably a combination heel process. Furthermore, the process can be done in a batch or continuous manner. A heel process is one where all of one or more of the reactants are present in the polymerization reactor, and the remaining reactants are metered, or fed, into the reactor over a period of time. A cofeed process is one where all of the reactants are metered, or fed, into the reactor over a period of time. A combination of a heel and a cofeed process is one where a portion of one or more of the reactants are present in the polymerization reactor, and the remainder of the one or more reactants are metered, or fed, into the reactor over a period of time. In a continuous mode, continuous removal of a portion of the reactor contents would be started after a portion of the reactants had been added, for example after approximately 30 minutes. The rate of the addition of the remaining reactants would then be continued at a rate equal to the discharge rate.

Preferably, the process of the present invention is conducted as a combination of a heel and a cofeed process wherein a portion of the chain transfer agent is present in the polymerization reactor and the remainder of the chain transfer agent and the other reactants are metered into the reactor. Preferably, from 50 to 100% of the total amount of chain transfer agent, such as phosphorous acid, is present in the reactor and the remainder of the chain transfer agent and the other reactants are metered into the reactor. Similarly, the other components used in the polymerization process, including optional components, such as metal salt promoters, can be present in the reactor or metered into the reactor or a combination thereof. Preferably, from 75 to 100%, more preferably substantially all, of the unsaturated acid monomers or salts thereof, and the one or more water-soluble initiators are fed into the reactor. The components which are fed into the reactor may be fed as separate streams or combined with one or more of the other feed streams. It is preferred that the initiator and the one or more monomers be fed as separate streams.

The streams are preferably fed linearly, that is, at constant rates, into the reactor. The feeds are generally conducted over a period of time preferably ranging from 5 minutes to 5 hours, more preferably 30 minutes to 4 hours, and most preferably 1 hour to 3 hours. If desired, the streams can be staggered so that one or more of the streams are started and/or completed before the others. The chain transfer agent stream may be started at the same time or before the one or more monomer streams, and preferably the chain transfer agent stream is completed at the same time or before the one or more monomer streams are completed.

The temperature of the polymerization reaction will depend on the choice of initiator and target molecular weight. Generally, the temperature of the polymerization is up to the boiling point of the system, for example from 60° to about 150° C., although the polymerization can be conducted under pressure if higher temperatures are used. Preferably, the temperature of the polymerization is from about 80° to 120° C. and most preferably from 85° to 110° C.

Compositions with high levels of polymeric phosphorus and low inorganic levels of inorganic phosphorous compounds are more useful in a number of end use applications including dispersants for paint formulations, additives for laundry and machine dishwashing detergents, mineral dispersants, dispersants for kaolin clay slurries and scale inhibitors, dispersants and corrosion inhibitors for water treatment and oil production. The fate of the phosphorous acid in the polymerization process is as a mixture of species; the phosphoric acid and phosphate species arise from oxidation side reactions. NMR analyses indicate the compositions include:

A-Polymeric (1) Monoalkyl Phosphonate    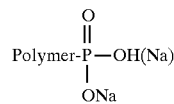

B-Inorganic(unincorporated)

(2) Phosphorous Acid (or salt)    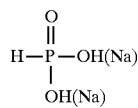

(3) Phophoric Acid (or salt)    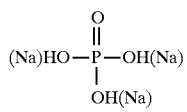

The ratio of these species present in the polymer product is a function of the process employed. As illustrated by the examples, the polymerization processes conducted at an in-process solids level of at least 50% results in more efficient use of the phosphorous acid as a chain transfer agent; that is, the process produces less unincorporated inorganic compounds and more polymer species, without having to resort to other more costly approaches. Polymers made by the process of the present invention are those where the polymer endgroups are substantially phosphonate endgroups.

The control of molecular weight and the narrow polydispersity of a polymer product is also an indication of the efficient utilization of a chain transfer agent. The process of the present invention results in low molecular weight water-soluble polymers containing phosphonate moieties incorporated into the polymer as endgroups. Low molecular weight refers to a weight average molecular weight ($M_w$) less than 20,000, preferably less than 10,000, and most preferably less than 5,000. In addition, the process of the present invention results in polymers having a narrow polydispersity. The polydispersity is the ratio of the weight average molecular weight ($M_w$) to the number average molecular weight ($M_n$). The molecular weights referred to are those measured by aqueous gel permeation chromatography (GPC) relative to a poly(acrylic acid) standard having $M_w$ of 4,500.

An application of particular interest for polymers containing phosphonate endgroups made by the process of the present invention involves use of the polymers as scale inhibitors for water treatment and oil production, especially the inhibition of BaSO₄ precipitation. Table 3 summarizes the efficiency of BaSO₄ inhibition (test method described in Example 12) for a comparative polymer additive (A) prepared by a prior art method (hypophosphorous acid) and a polymer prepared by the method of the present invention (B); polymers prepared by the method of the present invention are more effective (greater % inhibition) in inhibiting the formation of metal sulfate scale than those prepared by conventional methods when used at the same dosage levels.

TABLE 3

BaSO₄ Precipitation Inhibition

| Example | Polymer/ Method of Prep | Type of Polymer | $M_w$ | % Inhibition @ 24 and 32 ppm |
|---|---|---|---|---|
| A[1] (comp) | Poly(AA) (hypophosphite) | Phosphinate | 3160 | 48/51 |
| B[2] | Poly(AA) (phosphorous acid) | Phosphonate | 3650 | 62/90 |

[1] = commercial sample (mixture of dialkyl and monoalkyl phosphinate polymer), available as Bellasol ™ S40 from FMC Corporation
[2] = prepared by method of present invention Some embodiments of the invention are described in detail in the following Examples. All ratios, parts and percentages (%) are expressed by weight unless otherwise specified, and all reagents used are of good commercial quality unless otherwise specified. Abbreviations used in Examples and Tables are listed below:
AA=Acrylic Acid
MAL=Maleic Acid
MAA=Methacrylic Acid
AMPS=2-Acrylamido-2-methylpropanesulfonic acid
IPN=In-Process Neutralization (%)
IPS=In-Process Solids (%)
Init=Initiator
PHA=Phosphorous Acid (% based on monomers)
EDTA=Ethylenediaminetetraacetate Table 4 summarizes the experimental parameters of the Examples described below.

TABLE 4

| Ex # | % IPS | Fe Init | ppm | % PHA | Polymer | IPN | Temp °C. | $M_w$ |
|---|---|---|---|---|---|---|---|---|
| 1 | 56 | 1 | 6 | 10 | AA | 50 | 92 | 11300 |
| 1A | 56 | 1 | 6 | 10 | AA | 30 | 92 | 11000 |
| 2 | 56 | 1 | 6 | 10 | AA | 75 | 92 | 7440 |
| 3 | 55 | 1 | 6 | 10 | AA | 100 | 92 | 4890 |
| 4 | 40 | 1 | 6 | 10 | AA | 95 | 92 | 16100 |
| 4A | 56 | 1 | 6 | 10 | AA | 95 | 92 | 5540 |
| 4B | 60 | 1 | 6 | 10 | AA | 95 | 92 | 4040 |
| 5 | 50 | 1 | 6 | 10 | AA | 95 | 92 | 9410 |
| 6 | 56 | 2 | 6 | 10 | AA | 95 | 98 | 4050 |
| 7 | 56 | 2 | 0 | 10 | AA | 95 | 98 | 2860 |
| 8 | 56 | 2 | 0 | 10 | 70 AA/ 30 MAA | 95 | 98 | 4340 |
| 9 | 54 | 2 | 7.5 | 8 | 65 AA/ 25 MAL/ 10 AMPS | 28 | 92 | 10700 |
| 10 | 51 | 2 | 7.5 | 8 | 65 AA/ 25 MAL/ 10 AMPS | 89 | 92 | 4340 |
| 11 | 49 | 2 | 0 | 5 | AMPS | 0 | 98 | 3290 |

EXAMPLE 1 Poly(AA)

To a 500-milliliter four neck flask equipped with mechanical stirrer, reflux condenser, thermocouple and septum inlets for the gradual addition of monomer, caustic and initiator solution, was added 70.20 grams of deionized water, 15.00 grams of phosphorous acid (Aldrich, 99%), 14.63 grams of 50% aqueous sodium hydroxide and 3.00 grams of 0.15% FeSO₄.7H₂O. To a stirred solution of the above ingredients maintained at 92° C., 1.50 grams of sodium persulfate in 10.00 grams of deionized water, 83.30 grams of 50% aqueous sodium hydroxide and 150.00 grams of glacial acrylic acid were added linearly and separately over 120 minutes. After addition of the aforementioned feeds, the reaction mixture was held at temperature for 30 minutes.

The solution polymer at pH 5.0 was measured to have a solids content of 50.9%, residual acrylic acid of 951 ppm and a $M_w$ of 11,300 with a $M_n$ of 7,040. The ³¹P NMR indicated that 15 mole % of the phosphorous acid was present as an alkylphosphonate.

EXAMPLE 1A Poly(AA)

Same as Example 1 except that in-process neutralization was decreased to 30%.

EXAMPLE 2 Poly(AA)

To a 500-milliliter four neck flask equipped with mechanical stirrer, reflux condenser, thermocouple and septum inlets for the gradual addition of monomer, caustic and initiator solution was added 50.00 grams of deionized water, 15.00 grams of phosphorous acid (Aldrich, 99%), 14.65 grams of 50% aqueous sodium hydroxide and 3.00 grams of 0.15 weight % FeSO₄.7H₂O. To a stirred solution of the above ingredients maintained at 92° C., 1.50 grams of sodium persulfate in 10.00 grams of deionized water, 124.90 grams of 50% aqueous sodium hydroxide and 150.00 grams of glacial acrylic acid were added linearly and separately over 120 minutes. After addition of the aforementioned feeds, the reaction mixture was held at temperature for 30 minutes, then diluted with 46.70 grams of deionized water and cooled to room temperature.

The solution polymer at pH 5.8 was measured to have a solids content of 51.5%, residual acrylic acid of 863 ppm and a $M_w$ of 7,440 with a $M_n$ of 5,430. The ³¹P NMR indicated that 23 mole % of the phosphorous acid was present as an alkylphosphonate.

EXAMPLE 3 Poly(AA)

To a 500-milliliter four neck flask flask equipped with mechanical stirrer, reflux condenser, thermocouple and septum inlets for the gradual addition of monomer, caustic and initiator solution, was added 29.70 grams of deionized water, 15.00 grams of phosphorous acid (Aldrich, 99%), 14.60 grams of 50% aqueous sodium hydroxide and 3.00 grams of 0.15% FeSO₄.7H₂O. To a stirred solution of the above ingredients maintained at 92° C., 1.50 grams of sodium persulfate in 10.00 grams of deionized water, 166.50 grams of 50% aqueous sodium hydroxide and 150.00 grams of glacial acrylic acid were added linearly and separately over 120 minutes. After addition of the aforementioned feeds, the reaction mixture was held at temperature for 30 minutes, then diluted with 50.00 grams of deionized water and cooled to room temperature.

The solution polymer at pH 7.8 was measured to have a solids content of 50.5%, residual acrylic acid of 863 ppm and a $M_w$ of 4,890 with a $M_n$ of 4,000. The ³¹P NMR indicated that 35 mole % of the phosphorous acid was present as an alkylphosphonate.

EXAMPLE 4 Poly(AA)

To a 500-milliliter four neck flask equipped with mechanical stirrer, reflux condenser, thermocouple and septum inlets for the gradual addition of monomer, caustic and initiator solution, was added 186.00 grams of deionized water, 15.00 grams of phosphorous acid (Aldrich 99%), 14.63 grams of 50% sodium hydroxide and 3.00 grams of 0.15% $FeSO_4.7H_2O$. To a stirred solution of the above ingredients maintained at 92° C., 1.50 grams of sodium persulfate in 10.00 grams of deionized water, 158.2 grams of 50% aqueous sodium hydroxide and 150.00 grams of glacial acrylic acid were added linearly and separately over 120 minutes. After addition of the aforementioned feeds, the reaction mixture was held at temperature for 30 minutes and then cooled to room temperature.

The solution polymer at pH 6.5 was measured to have a solids content of 41.1%, residual acrylic acid of 2.06% and a $M_w$ of 16,100 with a $M_n$ of 9,660.

EXAMPLE 4A Poly(AA)

Same as Example 4 except that in-process solids was 56%.

EXAMPLE 4B Poly(AA)

Same as Example 4 except that in-process solids was 60%.

EXAMPLE 5 Poly(AA)

To a 500-milliliter four neck flask equipped with mechanical stirrer, reflux condenser, thermocouple and septum inlets for the gradual addition of monomer, caustic and initiator solution, was added 76.21 grams of deionized water, 15.00 grams of phosphorous acid (Aldrich, 99%), 14.63 grams of 50% aqueous sodium hydroxide and 3.00 grams of 0.15% $FeSO_4.7H_2O$. To a stirred solution of the above ingredients maintained at 92° C., 1.50 grams of sodium persulfate in 10.00 grams of deionized water, 158.20 grams of 50% aqueous sodium hydroxide and 150.00 grams of glacial acrylic acid were added linearly and separately over 120 minutes. After addition of the aforementioned feeds, the reaction mixture was held at temperature for 30 minutes and then cooled to room temperature.

The solution polymer at pH 6.7 was measured to have a solids content of 52.3%, residual acrylic acid of 3,415 ppm and a $M_w$ of 9,410 with a $M_n$ of 6,450.

EXAMPLE 6 Poly(AA)

To a 500-milliliter four neck flask equipped with mechanical stirrer, reflux condenser, thermocouple and septum inlets for the gradual addition of monomer, caustic and initiator solution, was added 35.00 grams of deionized water 15.00 grams of phosphorous acid (Aldrich, 99%), 14.63 grams of 50% aqueous sodium hydroxide and 3.00 grams of 0.15% $FeSO_4.7H_2O$. To a stirred solution of the above ingredients maintained at 98° C., 3.00 grams of sodium persulfate in 10.00 grams of deionized water, 158.20 grams of 50% aqueous sodium hydroxide and 150.00 grams of glacial acrylic acid were added linearly and separately over 120 minutes. After addition of the aforementioned feeds, the reaction mixture was held at temperature for 30 minutes, then diluted with 50.00 grams of deionized water and cooled to room temperature.

The solution polymer at pH 6.3 was measured to have a solids content of 50.9%, 646 ppm of residual acrylic acid and a $M_w$ of 4,050 with a $M_n$ of 3,430. The $^{31}P$ NMR indicated that 41 mole % of the phosphorous acid was present as an alkylphosphonate.

EXAMPLE 7 Poly(AA)

To a 500-milliliter four neck flask equipped with mechanical stirrer, reflux condenser, thermocouple and septum inlets for the gradual addition of monomer, caustic and initiator solution, was added 38.00 grams of deionized water 15.00 grams of phosphorous acid (Aldrich, 99%) and 14.65 grams of 50% aqueous sodium hydroxide. To a stirred solution of the above ingredients maintained at 98° C., 3.00 grams of sodium persulfate in 10.00 grams of deionized water, 158.00 grams of 50% aqueous sodium hydroxide and 150.00 grams of glacial acrylic acid were added linearly and separately over 120 minutes. After addition of the aforementioned feeds, the reaction mixture was held at temperature for 30 minutes, then diluted with 150.00 grams of deionized water and cooled to room temperature.

The solution polymer at pH 5.7 was measured to have a solids content of 41.2%, no detectable residual acrylic acid, with a $M_w$ of 2,860 and a $M_n$ of 2,460. The $^{31}P$ NMR indicated that 72 mole % of the phosphorous acid was present as an alkylphosphonate.

EXAMPLE 8 Poly(70 AA/30 MAA)

To a 500-milliliter four neck flask equipped with mechanical stirrer, reflux condenser, thermocouple and septum inlets for the gradual addition of monomer, caustic and initiator solution, was added 41.5 grams of deionized water, 15.00 grams of phosphorous acid (Aldrich, 99%) and 14.65 grams of 50% aqueous sodium hydroxide. To a stirred solution of the above ingredients maintained at 98° C., 3.00 grams of sodium persulfate in 10.00 grams of deionized water, 150.50 grams of 50% aqueous sodium hydroxide and a mixture containing 105.00 grams of glacial acrylic acid and 45.00 grams of glacial methacrylic acid were added linearly and separately over 120 minutes. After addition of the aforementioned feeds, the reaction mixture was held at temperature for 30 minutes, then diluted with 150.00 grams of deionized water and cooled to room temperature.

The solution polymer at pH 6.3 was measured to have a solids content of 40.8%, no detectable acrylic acid or methacrylic acid, with a $M_w$ of 4,340 and a $M_n$ of 3,420. The $^{31}P$ NMR indicated that 48 mole % of the phosphorous acid was present as an alkylphosphonate.

EXAMPLE 9 Poly(65 AA/25 MAL/10 AMPS)

To a 500-milliliter four neck flask equipped with mechanical stirrer, reflux condenser, thermocouple and septum inlets for the gradual addition of monomer, caustic and initiator solution, was added 105.00 grams of deionized water, 16.00 grams of phosphorous acid (Aldrich, 99%), 50.00 grams of maleic acid, 5.00 grams of 0.15% $FeSO_4.7H_2O$ and 76.00 grams of 50% aqueous sodium hydroxide. To a stirred solution of the above ingredients maintained at 92° C., 4.00 grams of sodium persulfate in 20.00 grams of deionized water and a mixture containing 130.00 grams of glacial acrylic acid and 44.25 grams of a 50% solution of the sodium salt of 2-acrylamido-2-methylpropanesulfonic acid (were added linearly and separately over 120 minutes. After addition of the aforementioned feeds, the reaction mixture was held at temperature for 30 minutes, then diluted with 40.00 grams of deionized water and cooled to room temperature.

The solution polymer at pH 3.6 was measured to have a solids content of 50.2%, no detectable acrylic acid or maleic acid, with a $M_w$ of 10,700 and a $M_n$ of 6,500.

EXAMPLE 10 Poly(65 AA/25 MAL/10 AMPS)

To a 500-milliliter four neck flask equipped with mechanical stirrer, reflux condenser, thermocouple and septum inlets for the gradual addition of monomer, caustic and initiator solution, was added 75.00 grams of deionized water, 16.00 grams of phosphorous acid (Aldrich, 99%), 50.00 grams of maleic acid, 5.00 grams of 0.15% $FeSO_4.7H_2O$ and 76.00 grams of 50% aqueous sodium hydroxide. To a stirred solution of the above ingredients maintained at 92° C., 4.00 grams of sodium persulfate in 20.00 grams of deionized water, 130 grams of 50% aqueous sodium hydroxide and a mixture containing 130.00 grams of glacial acrylic acid and 44.25 grams of a 50% aqueous solution of the sodium salt of 2-acrylamido-2-methylpropanesulfonic acid were added linearly and separately over 120 minutes. After addition of the aforementioned feeds, the reaction mixture was held at temperature for 30 minutes, then diluted with 45.00 grams of deionized water and cooled to room temperature.

The solution polymer at pH 7.0 was measured to have a solids content of 49.4%, no detectable acrylic acid and 80 ppm of residual maleic acid, with a $M_w$ of 4,340 and a $M_n$ of 3,400.

EXAMPLE 11 Poly(AMPS)

To a 500-milliliter four neck flask equipped with mechanical stirrer, reflux condenser, thermocouple and septum inlets for the gradual addition of monomer, caustic and initiator solution, was added 20.00 grams of deionized water, 7.50 grams of phosphorous acid (Aldrich, 99%) and 7.30 grams of 50% aqueous sodium hydroxide. To a stirred solution of the above ingredients maintained at 98° C., 3.00 grams of sodium persulfate in 10.00 grams of deionized water and 281.30 grams of a 53.36% aqueous solution of the sodium salt of 2-acrylamido-2-methylpropanesulfonate (pH 8.5) were added linearly and separately over 120 minutes. After addition of the aforementioned feeds, the reaction mixture was held at temperature for 20 minutes and then cooled to room temperature. The solution polymer at pH 2.6 was measured to have a solids content of 50.3%, no detectable residual monomer (proton NMR), with a $M_w$ of 3,290 and a $M_n$ of 2,900.

EXAMPLE 12 Test Method for Barium Sulfate Inhibition

The polymers prepared by the process of the present invention were tested for their ability to inhibit barium sulfate scale formation. The test method for measuring inhibition of barium sulfate consisted of the following steps: (1) preparation of test solutions containing the polymer to be tested, (2) incubation of the test solutions and (3) measurement of the amount of barium which did not precipitate in the test solutions. Accordingly, in comparing two test solutions, the test solution having the higher percent barium sulfate inhibition contains a scale inhibitor which is more effective in inhibiting metal sulfate scale formation.

The test solutions were prepared from a barium-containing solution, a sulfate-containing solution, a buffer solution, and an inhibitor solution containing the polymer to be tested; the concentration of polymer in the inhibitor solution was expressed as grams of polymer in the free acid (H) form. The composition of the barium- and sulfate-containing solutions, when combined in equal amounts, was as shown in Table 5. The barium-containing solution contained 382 mg/l of barium chloride and no sodium sulfate, while the sulfate-containing solution contained 4,378 mg/l of sodium sulfate and no barium chloride.

TABLE 5

Composition of "Barium Sulfate" Containing Solution

| Components | Concentration: milligrams/liter (mg/l) |
|---|---|
| KCl | 795 |
| NaCl | 49,060 |
| $CaCl_2$ | 4,480 |
| $MgCl_2$ | 3,665 |
| $BaCl_2$ | 192 |
| $SrCl_2$ | 526 |
| $Na_2SO_4$ | 2190 |
| $NaHCO_3$ | 425 |
| Deionized Water | balance |

Compositions of the buffer and inhibitor solutions were as follows:

| Components | Concentration |
|---|---|
| Buffer Solution | |
| $CH_3COONa.3H_2O$ | 13.6 g/100 g soln |
| $CH_3COOH$ | 0.535 g/100 g soln |
| Deionized Water | balance |
| Inhibitor Solution | |
| Scale inhibitor to be tested | 1 g/liter |
| Deionized Water | balance |

The barium- and sulfate-containing solutions were filtered through a 0.45 micron filter and adjusted to a pH of 6.0 with dilute HCl. The inhibitor solution was adjusted to a pH of 6.0 with dilute HCl or dilute NaOH.

The test solutions containing a polymer to be tested, hereinafter called the "inhibitor test solution," were prepared by combining 1 ml of the buffer solution, 50 ml of the sulfate-containing solution, the desired amount of inhibitor solution (corresponding to specified use levels of 24 or 32 ppm based on total weight of test solution), and 50 ml of the barium-containing solution.

As controls, a "no inhibitor" test solution, a sulfate test solution and a barium test solution were prepared. The "no inhibitor" test solution was prepared by combining 1 ml of the buffer solution, 50 ml of the sulfate-containing solution, 50 ml of the barium-containing solution, and deionized water in an amount equal to the amount of inhibitor solution added to the inhibitor test solution. For example, if 2.5 ml of inhibitor solution (total) was added to the inhibitor test solution, 2.5 ml of deionized water was added to the "no inhibitor" test solution. The sulfate test solution was prepared by combining 1 ml of the buffer solution, 100 ml of the sulfate-containing solution, and deionized water in an amount equal to the amount of inhibitor solution added to the inhibitor test solution. The barium test solution was prepared by combining 1 ml of the buffer solution, 100 ml of the barium-containing solution, and deionized water in an amount equal to the amount of inhibitor solution added to the inhibitor test solution.

The inhibitor, no inhibitor, sulfate, and barium test solutions were placed in a water bath at 85° C. and gently shaken for 24 hours. After the 24 hour incubation period, the test solutions were removed one at a time from the water bath and a diluted test solution was prepared from each test solution for analyzing barium content. The diluted test solution was prepared by adding to a 100 ml flask the following ingredients in the order listed:

(1) 5 ml of EDTA Solution
(2) 30 ml of deionized water
(3) 5–10 g of supernatant taken from the incubated test solution
(4) deionized water (balance to make 100 ml)

The EDTA Solution consisted of 100 grams of $K_2EDTA.2H_2O$ per 1000 grams of solution and deionized water (balance). The pH of the EDTA Solution was adjusted to 10.5 with KOH pellets.

The diluted test solutions were measured for barium using direct current plasma on a Spectra Span 7 DCP Spectrometer manufactured by Applied Research Laboratories Fisons located in Valencia, Calif. The concentration of the barium in the undiluted test solutions was calculated from the measured values of barium. The percent barium sulfate inhibition was obtained from the following formula:

$$\text{Percent BaSO}_4 \text{ Inhibition} = \frac{100 \times [\text{Ba Inhibitor} - \text{Ba No Inhibitor}]}{0.5 \times [\text{Ba Barium} + \text{Ba Sulfate}] - \text{Ba No Inhibitor}}$$

where:
Ba Inhibitor=concentration of barium in inhibitor test solution
Ba No Inhibitor=concentration of barium in no inhibitor test solution
Ba Barium=concentration of barium in barium test solution
Ba Sulfate=concentration of barium in sulfate test solution

We claim:

1. A process for preparing low-molecular weight phosphonate-terminated polymers, comprising polymerizing monomers selected from one or more of unsaturated carboxylic acid monomers, unsaturated "non-carboxylic" acid monomers and unsaturated acid-free monomers, in the presence of (a) water, (b) one or more water-soluble initiators and (c) phosphorous acid or a salt thereof; wherein the unsaturated carboxylic acid monomers are selected from one or more of unsaturated monocarboxylic acid monomers and unsaturated dicarboxylic acid monomers; wherein from 75 to 100 percent by weight of the unsaturated monocarboxylic acid monomers are metered into a polymerization reactor containing water and from 25 to 100 percent by weight of the phosphorous acid or salts thereof; and wherein an alkaline neutralizer is present during the polymerization in an amount sufficient to neutralize at least 30 percent, based on equivalents, of the acid groups of the unsaturated carboxylic acid monomers present; to provide an in-process solids level of at least 40 percent, based on the weight of solid reactants relative to the combined weight of solid reactants and water at the end of the polymerization.

2. The process of claim 1 wherein the in-process solids level is from 50 to 70 percent by weight.

3. The process of claim 2 wherein the alkaline neutralizer is present in an amount sufficient to neutralize 50 to 100 percent, based on equivalents, of the acid groups of the unsaturated carboxylic acid monomers.

4. The process of claim 1 wherein the phosphorous acid is present in an amount of from 1 to 25 percent by weight based on total monomer weight.

5. The process of claim 1 wherein the phosphorous acid is present in an amount of from greater than 5% to about 15% by weight based on total monomer weight.

6. The process of claim 1 wherein the one or more water-soluble initiators are present in an amount of from 0.5 to 20 percent by weight based on total monomer weight.

7. The process of claim 1 wherein the unsaturated carboxylic acid monomer, or salts thereof, are metered into the polymerization reactor containing water and from 50 to 100 percent of the phosphorous acid or salts thereof.

8. The process of claim 1 wherein the unsaturated monocarboxylic acid monomers are metered into the polymerization reactor over a period from 5 minutes to 5 hours.

9. The process of claim 1 wherein the monomers comprise from 20 to 100 percent by weight of monomers selected from one or more of unsaturated mono- and dicarboxylic acid monomers and from 80 to 0 percent by weight of monomers selected from one or more unsaturated acid-free monomers.

10. The process of claim 1 wherein the monomers comprise from 25 to 90 percent by weight of monomers selected from one or more of unsaturated mono- and dicarboxylic acid monomers and from 75 to 10 percent by weight of monomers selected from one or more unsaturated "non-carboxylic" acid monomers.

11. The process of claim 1 wherein the low molecular weight phosphonate-terminated polymer has a $M_w$ of less than 10,000.

12. The process of claim 1 wherein the low molecular weight polymer contains endgroups that are substantially phosphonate endgroups.

13. The process of claim 1 wherein the alkaline neutralizer is selected from one or more of sodium hydroxide, potassium hydroxide, ammonium hydroxide, triethanolamine, dimethylaminoethanol, ethanolamine and trimethylhydroxyethylammonium hydroxide.

14. The process of claim 1 wherein the monomers are selected from one or more of are acrylic acid, methacrylic acid, maleic acid, maleic anhydride, 2-acrylamido-2-methylpropanesulfonic acid and water-soluble salts thereof.

15. The process of claim 1 wherein the unsaturated carboxylic acid monomer is selected from one or more of acrylic acid, methacrylic acid, crotonic acid, vinylacetic acid, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, fumaric acid, citraconic acid and alkali metal and ammonium salts thereof.

16. The process of claim 1 wherein the unsaturated "non-carboxylic" acid monomer is selected from one or more of 2-acrylamido-2-methylpropanesulfonic acid, allylsulfonic acid, allylphosphonic acid, allyloxybenzenesulfonic acid, 2-hydroxy-3-(2-propenyloxy)propanesulfonic acid, 2-methyl-2-propene-1-sulfonic acid, isopropenylphosphonic acid, phosphoethyl methacrylate, vinylphosphonic acid, styrene-sulfonic acid, vinylsulfonic acid and alkali metal and ammonium salts thereof.

17. The process of claim 1 wherein the unsaturated acid-free monomer is selected from one or more of acrylamide, methacrylamide, N-tert-butylacrylamide, N-methylacrylamide, N,N-dimethylacrylamide, methyl acrylate, ethyl acrylate, butyl acrylate, methyl methacrylate, butyl methacrylate, isobutyl methacrylate, hydroxyethyl acrylate, hydroxypropyl acrylate, hydroxyethyl methacrylate, acrylonitrile, methacrylonitrile, allyl alcohol, 2-vinylpyridine, 4-vinylpyridine, N-vinylpyrrolidone, N-vinylformamide, N-vinylimidazole, vinyl acetate and styrene.

* * * * *